(12) United States Patent
Teetzel et al.

(10) Patent No.: US 12,389,972 B2
(45) Date of Patent: Aug. 19, 2025

(54) RECLINING HELMET MOUNT APPARATUS

(71) Applicant: WILCOX INDUSTRIES CORP., Newington, NH (US)

(72) Inventors: James W. Teetzel, Portsmouth, NH (US); Gary M. Lemire, Lee, NH (US); Patrick K. Graham, Kittery, ME (US)

(73) Assignee: Wilcox Industries Corp., Newington, NH (US)

( * ) Notice: Subject to any disclaimer, the term of this patent is extended or adjusted under 35 U.S.C. 154(b) by 0 days.

(21) Appl. No.: 18/655,175

(22) Filed: May 3, 2024

(65) Prior Publication Data

US 2024/0365912 A1 Nov. 7, 2024

Related U.S. Application Data

(60) Provisional application No. 63/464,256, filed on May 5, 2023.

(51) Int. Cl.
*A42B 3/32* (2006.01)
*G06F 1/16* (2006.01)
*G02B 27/01* (2006.01)

(52) U.S. Cl.
CPC .............. *A42B 3/324* (2013.01); *G06F 1/163* (2013.01); *G02B 27/0176* (2013.01)

(58) Field of Classification Search
CPC ......... A42B 3/324; A42B 3/04; A42B 3/0406; A42B 3/042

USPC ............................................................ 2/422
See application file for complete search history.

(56) References Cited

U.S. PATENT DOCUMENTS

| | | | |
|---|---|---|---|
| 4,449,787 A | 5/1984 | Burbo et al. | |
| 5,416,922 A | 5/1995 | Horvat et al. | |
| 5,506,730 A | 4/1996 | Morley et al. | |
| 6,125,477 A | 10/2000 | Crippa et al. | |
| 7,219,370 B1 | 5/2007 | Teetzel et al. | |
| 11,627,774 B2* | 4/2023 | Meney | F16M 13/04 |
| | | | 248/187.1 |
| 2008/0263752 A1* | 10/2008 | Solinsky | A42B 3/042 |
| | | | 2/422 |
| 2014/0082810 A1 | 3/2014 | Bjorn et al. | |
| 2014/0373423 A1 | 12/2014 | Teetzel et al. | |
| 2018/0231404 A1* | 8/2018 | Kitain | A42B 3/042 |
| 2022/0071336 A1* | 3/2022 | Franzino | A42B 3/04 |
| 2024/0365913 A1 | 11/2024 | Teetzel et al. | |

OTHER PUBLICATIONS

International Search Report and Written Opinion in Application No. PCT/US2024/027894 dated Aug. 8, 2024.

* cited by examiner

*Primary Examiner* — Timothy K Trieu
(74) *Attorney, Agent, or Firm* — McLane Middleton, Professional Association

(57) ABSTRACT

A helmet mount apparatus includes a track assembly and a sliding carriage assembly slidable coupled to the track assembly. A combined vertical adjustment and pivot assembly pivotally is coupled to the sliding carriage assembly, wherein the combined vertical adjustment and pivot assembly includes a bracket for attaching a viewing device.

13 Claims, 17 Drawing Sheets

1ST ACTION: ROTATE HUD TO LIMITER TO CLEAR HELMET BRIM (APPROXIMATELY 15°)

PARALLEL TO HORIZON – DEPLOYED POSITION

3RD ACTION: SLIDE CARRIAGE UP AND BACK TO ENGAGE UPPER CARRIAGE LOCK - STOWED POSITION

2ND ACTION: PUSH TO UNLOCK CARRIAGE FROM TRACK LOCK GROOVE (APPROXIMATELY 5°)

1ST ACTION: ROTATE TO LIMITER TO
CLEAR HELMET BRIM (APPROXIMATELY 15°)
(HUD REMOVED FOR CLARITY)

PARALLEL TO HORIZON - DEPLOYED POSITION
(HUD REMOVED FOR CLARITY)

3RD ACTION: SLIDE CARRIAGE UP AND BACK TO
ENGAGE UPPER CARRIAGE LOCK - STOWED POSITION
(HUD REMOVED FOR CLARITY)

2ND ACTION: PUSH TO UNLOCK CARRIAGE FROM
TRACK LOCK GROOVE (APPROXIMATELY 5°)
(HUD REMOVED FOR CLARITY)

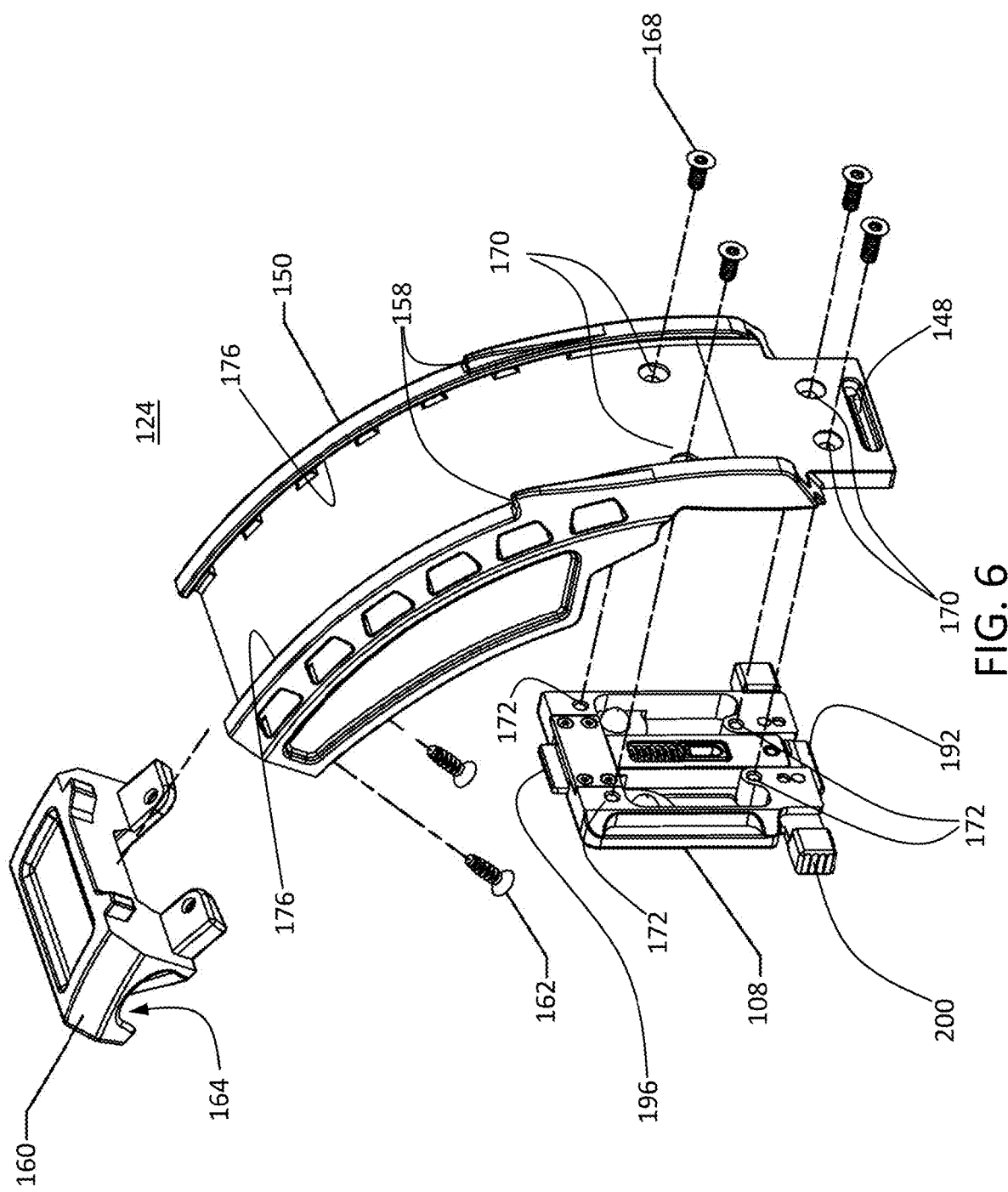

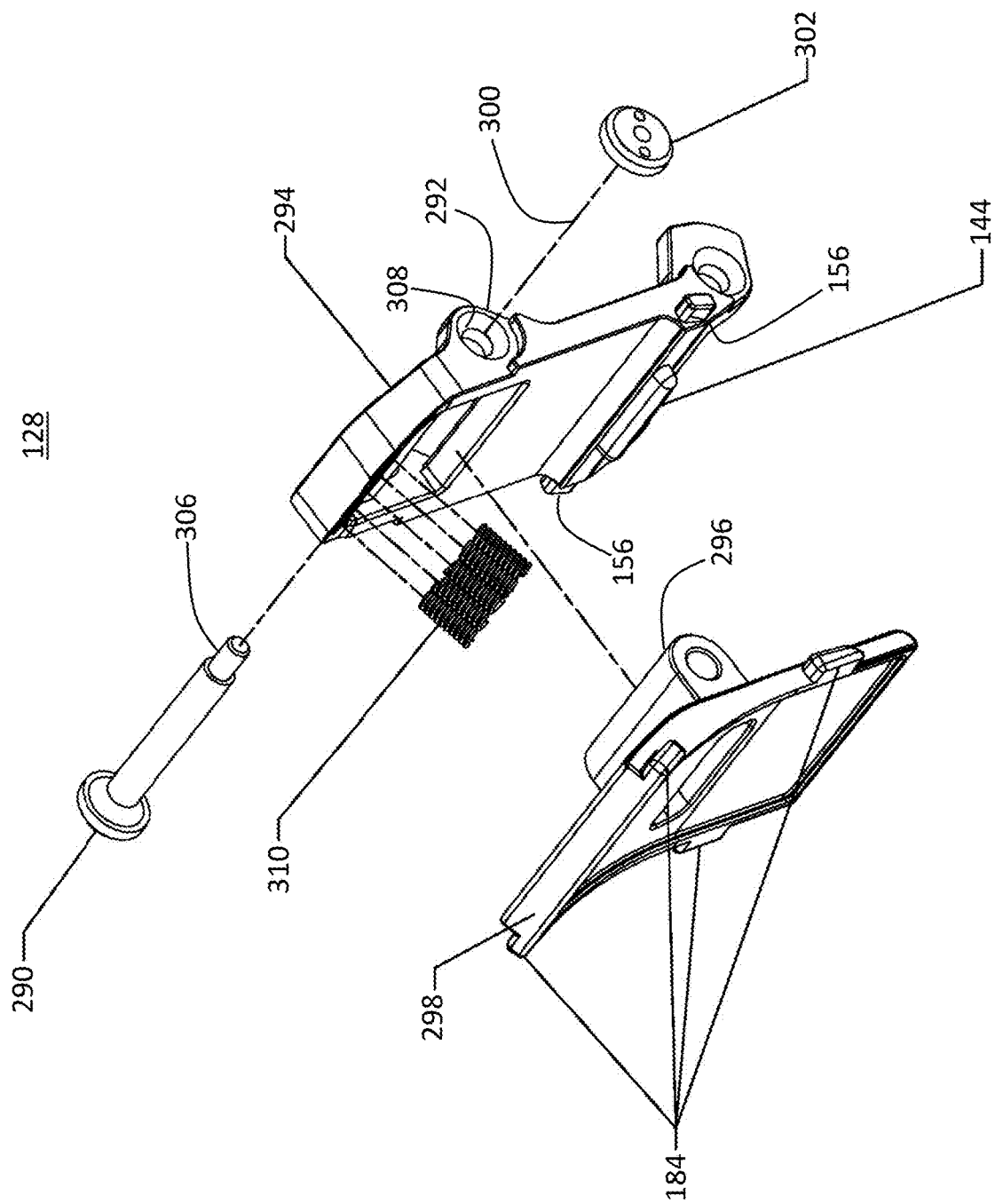

RECLINING HELMET MOUNT APPARATUS

CROSS REFERENCE TO RELATED APPLICATION

This application claims the priority benefit of U.S. provisional application No. 63/464,256 filed May 5, 2023. The aforementioned application is incorporated herein by reference in its entirety.

INCORPORATION BY REFERENCE

This application is related to commonly owned U.S. Pat. No. 7,219,370 entitled "Helmet Mounting Systems" and U.S. Pat. No. 9,775,395 entitled "Headgear Shroud Assembly". Each of the aforementioned patents is incorporated herein by reference in its entirety.

BACKGROUND

The present disclosure relates to a helmet mount assembly and, in particular, to a reclining mount for alternately positioning a helmet mounted display which is mounted to a helmet or similar headgear between a viewable position and a stowed position. The present disclosure contemplates a new and improved helmet mount apparatus and method. The helmet mount apparatus is suited for mounting a display device such as a virtual reality (VR) display, augmented reality (AR) display, head up display (HUD), or other near eye display, although it is also amenable to mounting other viewing devices, including optical and electro-optical devices, including without limitation binoculars, night vision devices, electronic night vision devices, cameras such as thermal cameras, short wave infrared (SWIR) cameras, visors, face shields, optical filters and attenuators, and others.

SUMMARY

A helmet mount apparatus includes a track assembly and a sliding carriage assembly slidably coupled to the track assembly. A combined vertical adjustment and pivot assembly is pivotally coupled to the sliding carriage assembly, wherein the combined vertical adjustment and pivot assembly includes a bracket for attaching a viewing device.

In one aspect, a helmet mount apparatus for adjusting a position of a viewing device on a helmet includes a track subassembly removably attachable to the helmet and a carriage subassembly slidably attached to and movable along the track subassembly. A vertical adjustment subassembly is configured for detachably coupling the viewing device. A first pivot assembly is disposed between the carriage subassembly and the vertical adjustment subassembly such that the vertical adjustment subassembly and the viewing device removably attached thereto are pivotable with respect to the carriage subassembly and the helmet.

In a more limited aspect, the carriage subassembly includes a locking tongue extending inward toward the helmet and first and second locking tabs extend laterally from opposing sides of the carriage subassembly. The track subassembly includes a groove that engages with the locking tongue to place the carriage subassembly in a deployed position wherein the viewing device is generally parallel to a user's line of sight and first and second locking shoulders that engage with the first and second locking tabs, respectively, to place the carriage subassembly in a stowed position wherein the viewing device is above the user's line of sight.

In another more limited aspect, the carriage subassembly further includes a sliding plate member having one or more sliding tongues extending transversely from opposing sides thereof and the track subassembly includes a track with channels transversely spaced apart on opposing sides of the track, the channels spaced to accommodate the sliding plate member and configured to slidably receive the one or more sliding tongues.

In another more limited aspect, the carriage subassembly further includes a sliding plate member having an outward-extending second inner hinge knuckle and a carriage pivot lock plate, wherein the sliding plate member is disposed between the track subassembly and the carriage pivot lock plate. The locking tongue is disposed on a lower end of the carriage pivot lock plate. The carriage pivot lock plate includes an opening and second outer hinge knuckles, wherein the second inner hinge knuckle of the sliding plate member passes through the opening and is complementary with the second outer hinge knuckles. The helmet mount apparatus further includes a second pivot hinge assembly having a second pivot rod passing through the second outer and inner knuckles. One or more springs are disposed intermediate the carriage pivot lock plate and the sliding plate member, the one or more spring configured to bias the locking tongue toward the track subassembly for secure engagement of the locking tongue and the groove.

In another more limited aspect, the helmet mount apparatus of claim 1, wherein the track subassembly further includes a track stop configured to limit a range of sliding movement of the carriage along the track subassembly.

In another more limited aspect, the carriage subassembly includes opposing first and second outer hinge knuckles and the vertical adjustment subassembly includes one or more inner hinge knuckles intermediate the first and second outer hinge knuckles. The first pivot assembly includes a first pivot rod passing through the first and second outer hinge knuckles and the one or more inner hinge knuckles along a first pivot axis.

In another more limited aspect, the first and second outer hinge knuckles engage the vertical adjustment subassembly, the first and second outer hinge knuckles having tilt-limiting stop flats formed thereon for limiting a range of rotation of the vertical adjustment subassembly with respect to the carriage subassembly.

In another more limited aspect, the first pivot assembly has an angle of rotation of about 15 degrees.

In another more limited aspect, the vertical adjustment subassembly includes a mounting bracket for attaching the viewing device.

In another more limited aspect, the vertical adjustment subassembly includes one or more alignment pins configured to engage one or more complementary receptacles in the viewing device for aligning the vertical adjustment subassembly with the viewing device.

In another more limited aspect, the track subassembly includes at least one cable management trough.

In another more limited aspect, the vertical adjustment subassembly is configured to allow vertical adjustment of the viewing device with respect to a user's line of sight.

In a further aspect, a method for moving a helmet mount apparatus between a deployed position and a stowed position or vice versa includes, if the helmet mount apparatus is in the deployed position, rotating the viewing device upward by rotating along the first pivot assembly and pushing the viewing device outward, away from the track subassembly such that the locking tongue of the carriage subassembly disengages from the groove of the track subassembly. The viewing device is slid upward with respect to the track subassembly until the locking tabs of the carriage subassembly move past the shoulder of the track subassembly. If the helmet mount apparatus is in the deployed position, the viewing device is pushed outward, away from the track subassembly such that the locking tabs of the carriage subassembly disengage from the shoulders of the track subassembly. The viewing device is slid downward with respect to the track subassembly until the locking tongue of the carriage assembly engages with the groove of the track subassembly and the viewing device is rotated downward by rotating along the first pivot assembly.

Various advantages and benefits of the present development will become apparent to persons skilled in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 6 is an exploded isometric view of the recliner apparatus.

FIG. 10B is a generally rear exploded isometric view of the sliding carriage subassembly.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Detailed embodiments of the present development are disclosed herein; however, it is to be understood that the disclosed embodiments are merely exemplary of the invention, which may be embodied in various forms. Therefore, specific structural and functional details disclosed herein are not to be interpreted as limiting but merely as a basis for the claims and as a representative basis for teaching one skilled in the art to variously employ the present inventive concept in virtually any appropriately detailed structure. Further, the terms and phrases used herein are not intended to be limiting but rather to provide an understandable description of the present development.

The terms "a" or "an," as used herein, are defined as one or more than one. The term "another," as used herein, is defined as at least a second or more. The terms "including" and/or "having" as used herein, are defined as comprising (i.e., open transition). The term "coupled" or "operatively coupled," as used herein, is defined as indirectly or directly connected.

As used in this disclosure, the terms "front," "rear," "upper," "lower," "upwardly," "downwardly," "left," "right," and other orientation descriptors are intended to facilitate the description of the exemplary embodiment(s) of the present invention in relation to the provided figures, and are not intended to limit the structure thereof to any particular position or orientation.

As used herein, the term "shroud" refers to a component attached to the frontal portion of a helmet which is designed to serve as a mounting fixture or interfacing platform for facilitating attachment of helmet-mounted devices.

Figure 1:
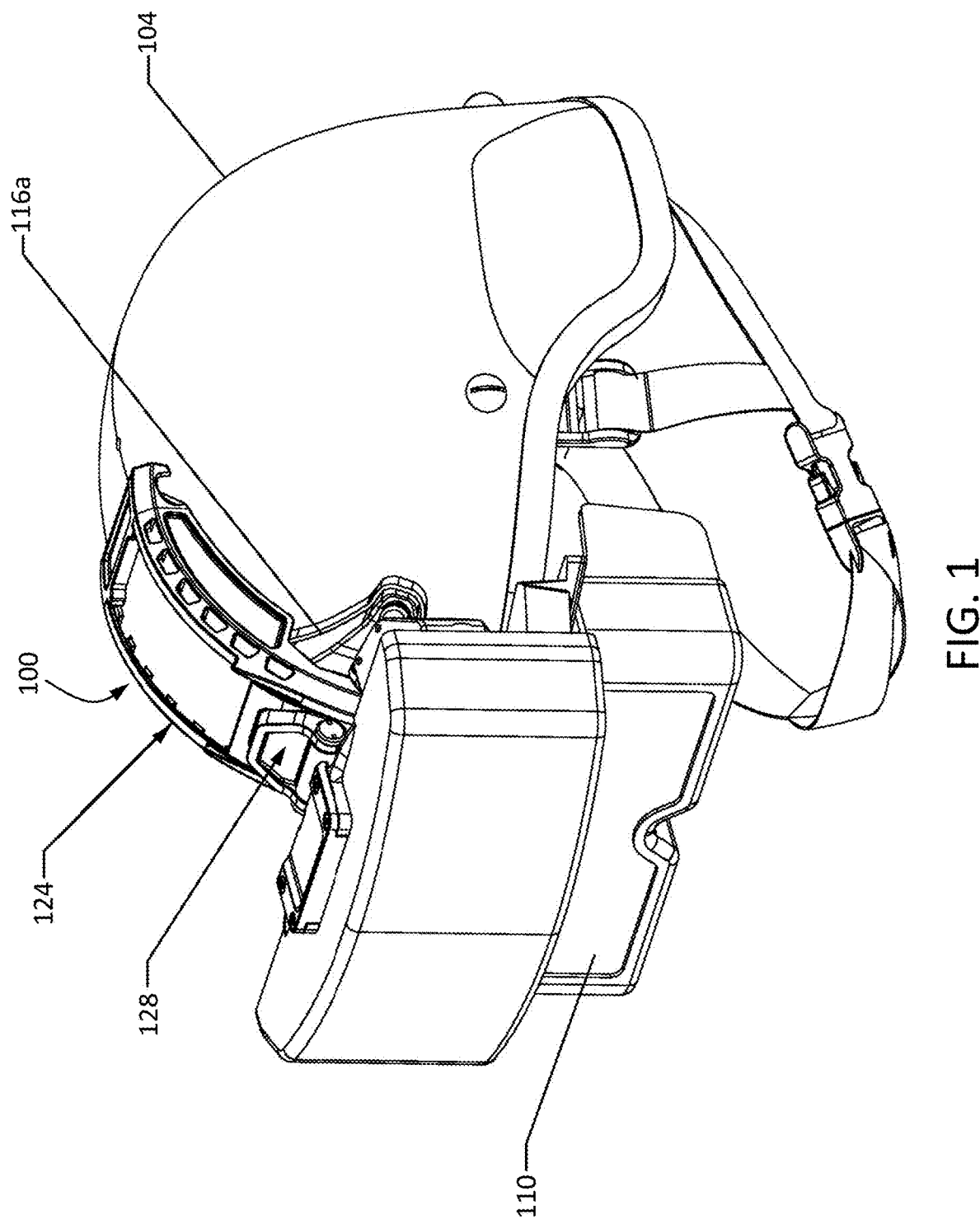
FIG. 1 is an isometric view of a helmet employing the reclining helmet mount apparatus in conjunction with a first shroud.

Referring now to FIG. 1 there is shown a reclining helmet mount assembly 100 attached to a helmet 104 for supporting a viewing device 110 in front of the eyes of a user. The viewing device 110 may be a near eye display, virtual reality display, augmented reality display, mixed reality display, holographic display, head up display, or the like.

The helmet mount assembly 100 includes a shroud interface assembly 108 configured for detachably securing to a front shroud 116a, 116b of a helmet. In embodiments, the shroud is a legacy shroud 116a configured to receive a G22 or G24 series shroud available from Wilcox Industries Corp. of Newington, NH. Such shrouds include, for example, shrouds in the L4 series from Wilcox Industries Corp., including without limitation the Wilcox L4 one hole shroud for helmets having a single hole pattern and the Wilcox L4 three hole shroud for helmets having a three hole pattern.

Figure 2:
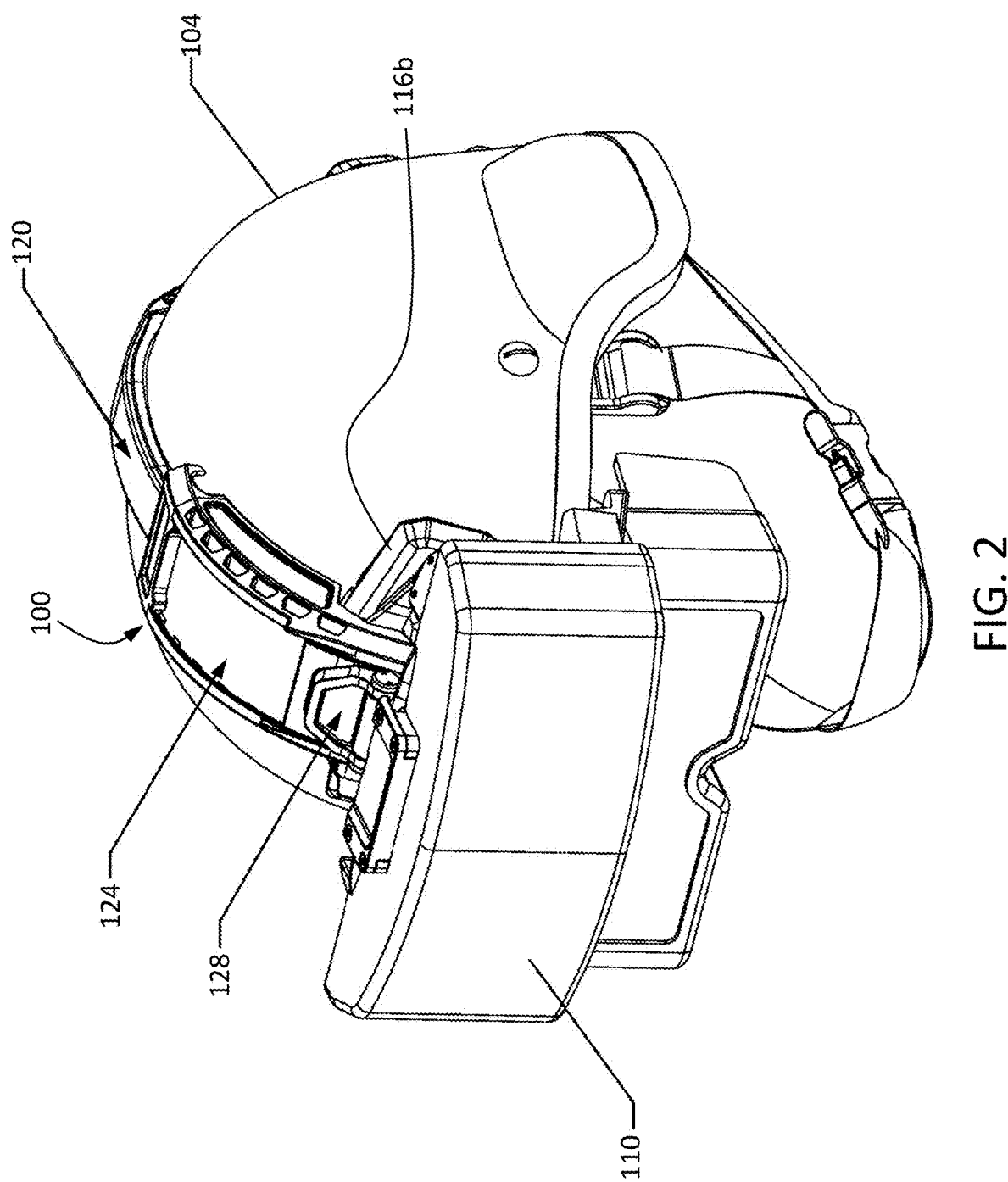
FIG. 2 is an isometric view of a helmet employing the reclining helmet mount apparatus in conjunctions with a second shroud and attachment system.

Referring now to FIG. 2, the front shroud may be a shroud 116b associated with the Wilcox Industries Corp. Universal Helmet Mount Assembly or CLAW helmet attachment system 120.

The helmet mount assembly 100 includes a helmet track subassembly 124 and a sliding carriage subassembly 128 slidably attached thereto. A vertical adjustment subassembly 130 is pivotably coupled to the sliding carriage subassembly 128. The vertical adjustment subassembly 130 in turn is secured to the viewing device 110.

Figure 3B:
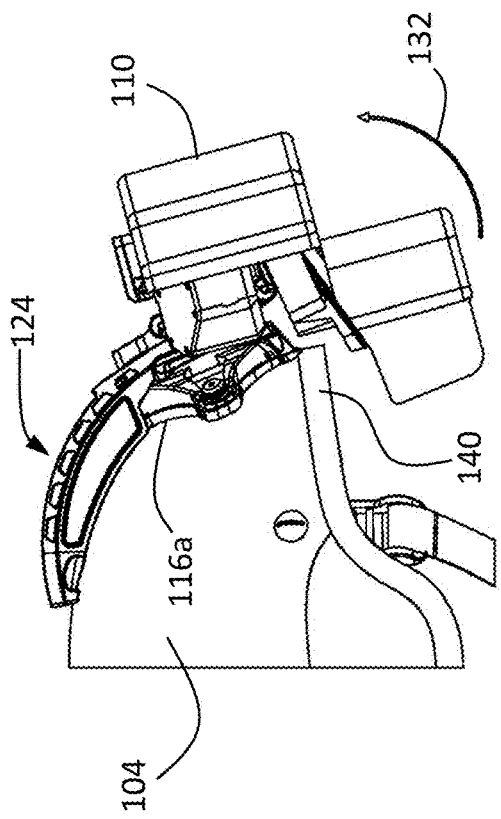
FIGS. 3A-3D are sequential side views illustrating the transition of the viewing device from the deployed position to the stowed position.
Figure 3A:
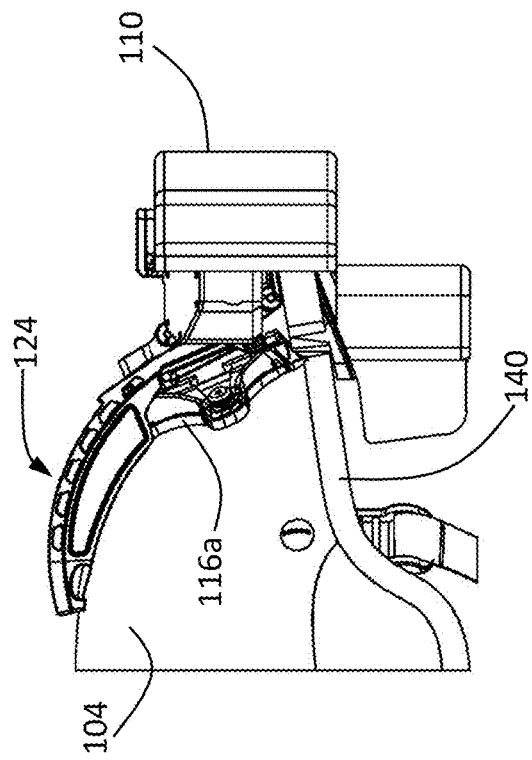

Referring now to FIGS. 3A-3D and 4A-4D, there is illustrated the manner of moving the viewing device 110 from the deployed or operable position to a stowed position. In FIG. 3A, the viewing device is in the deployed position wherein the viewing device 110 is parallel to the horizon or user's line of sight. To move the viewing device 110 to the stowed position, the user first rotates the viewing device 110 as indicated by the arrow 132 in FIG. 3B. The tilt limiting stop flats 136 (see FIG. 8B) in the sliding carriage subassembly 128 limit the range of rotation to an extent sufficient to allow the viewing device 110 to clear the brim 140 of the helmet 104. In embodiments, the angle of rotation is about 15 degrees.

Figure 3D:
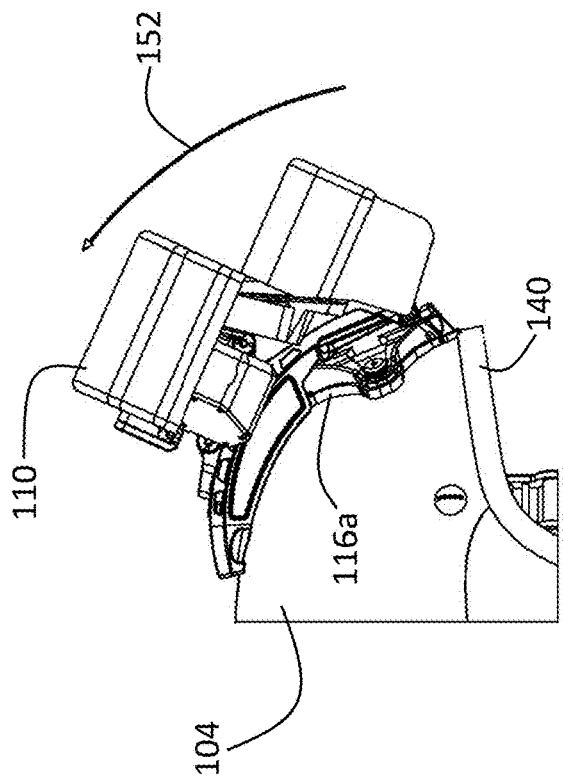
Figure 3C:
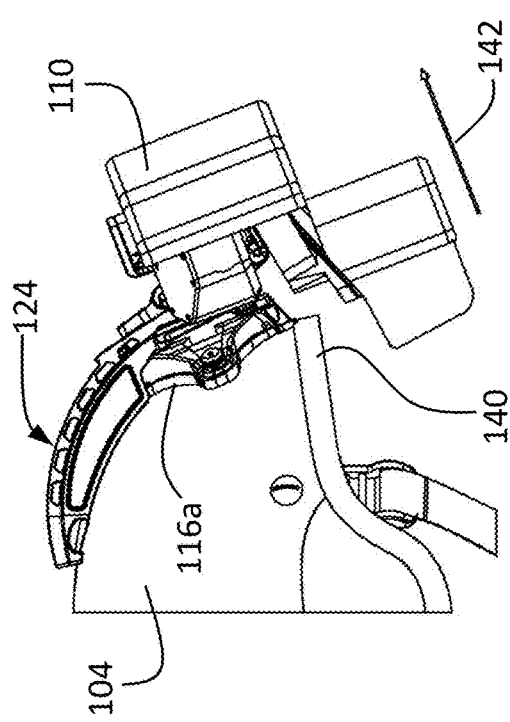
Figure 4B:
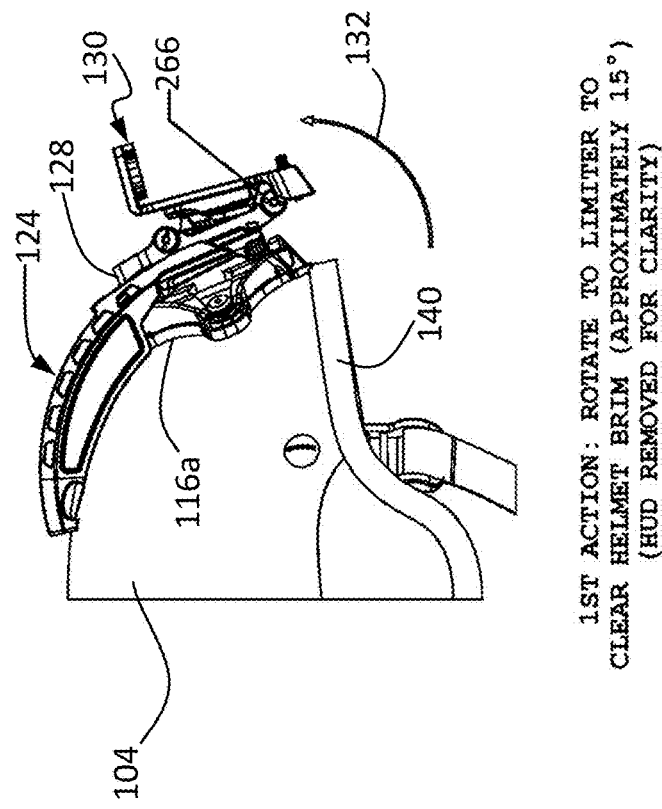
FIGS. 4A-4D are sequential side views illustrating the transition of the vertical adjustment subassembly from the deployed position to the stowed position.
Figure 4A:
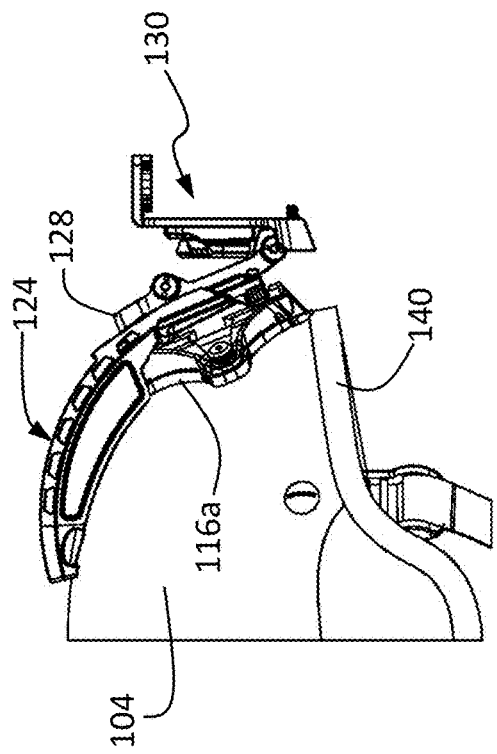
Figure 4D:
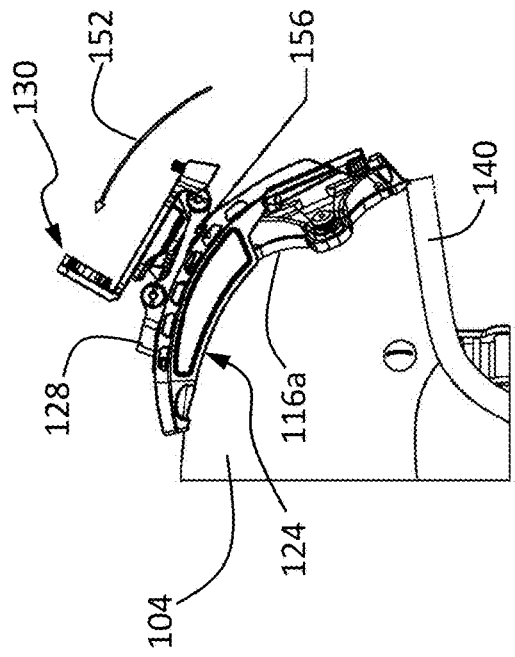
Figure 4C:
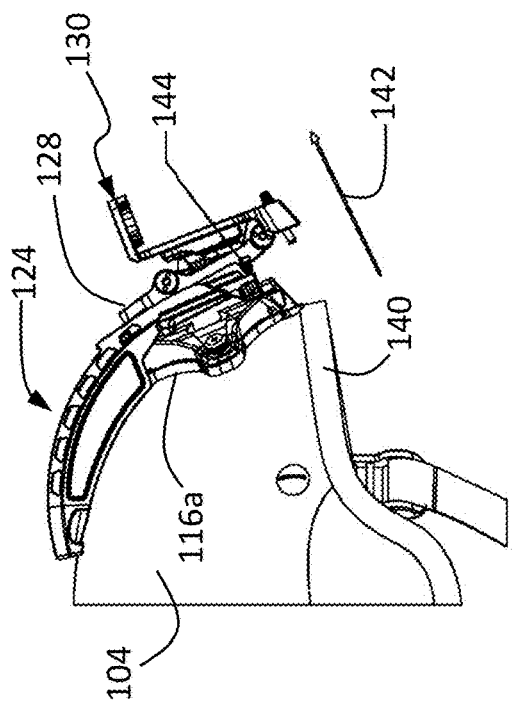

Next, the viewing device 110 is pushed outward, away from the track subassembly 124 as indicated by the arrow 142 in FIG. 3C. This causes a locking tongue 144 (see FIG. 10B) on the sliding carriage subassembly 128 to disengage from a complementary locking groove 148 (see FIG. 6) on the track subassembly 124.

Next, the sliding carriage subassembly 128 is slid upward with respect to the helmet track subassembly 124 as indicated by the arrow 152 in FIG. 3D. The sliding carriage subassembly 128 is slid upward along a track 150 until locking tab 156 (see FIG. 5) on opposing sides of the sliding carriage subassembly 128 move past shoulders 158 on opposing sides of the track 150 to secure the viewing device 110 in the stowed position. To return the viewing the viewing device 110 to the deployed position, the viewing device 110 is lifted away from the track 150 until the locking tabs 156 clear the shoulders 158 and the process as described above is reversed.

Figure 5:
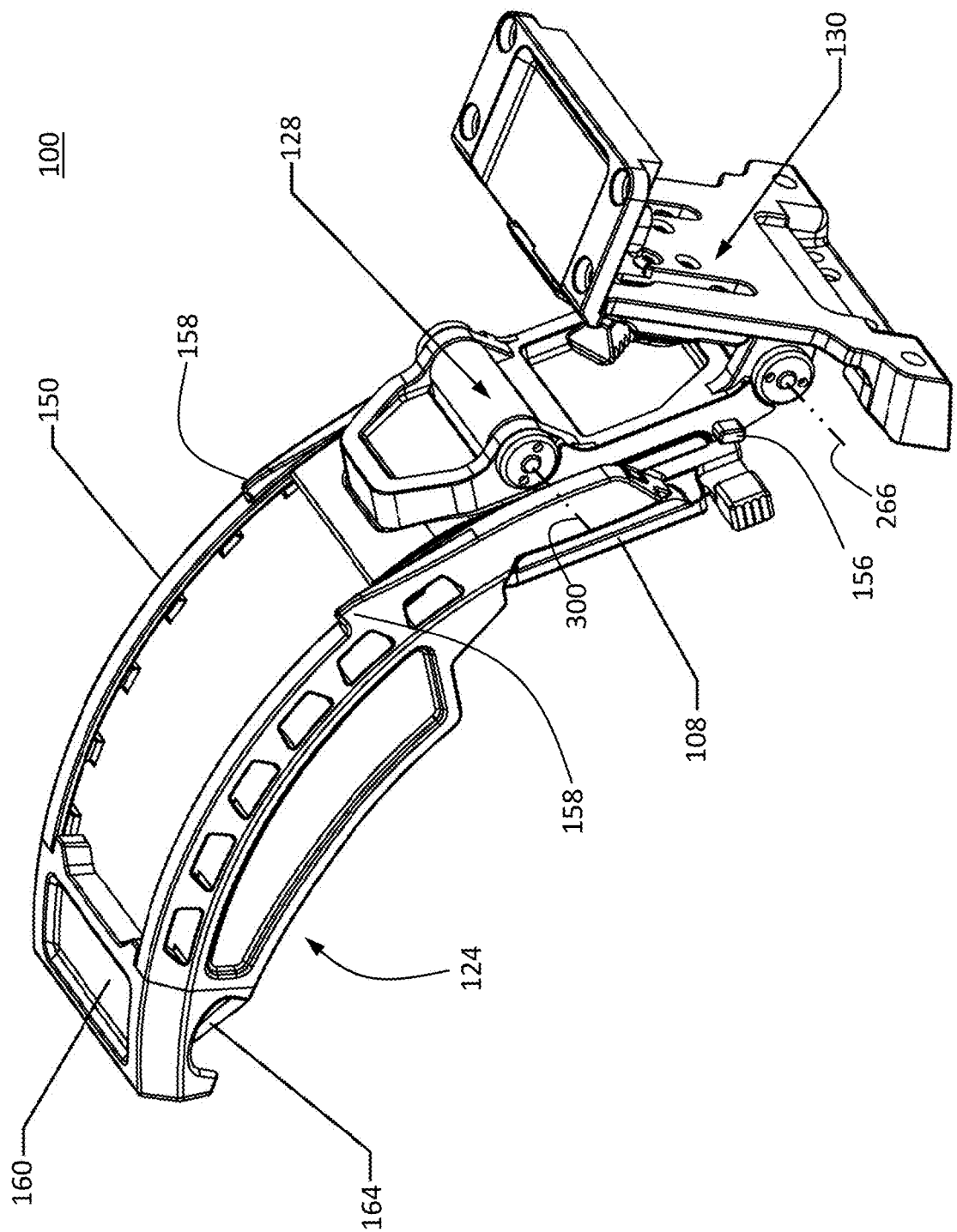
FIG. 5 is an enlarged isometric view of the recliner apparatus.

Referring now to FIGS. 5 and 6, the track subassembly 124 includes the track 150. A track stop 160 is secured to the track 150 with threaded fasteners 162 and is disposed at the distal end of the track 150 to limit sliding movement of the sliding carriage subassembly 128 there past. In embodiments, cable management apertures or channels 164 are provided in the track subassembly 124. Threaded fasteners 168 pass through clearance opening 170 at the proximal end of the track 150 and engage tapped openings 172 in the helmet shroud interface subassembly 108 to secure the shroud interface assembly 108 to the track 150.

The track 150 includes opposing channels or grooves 176 which run parallel to each other and are spaced apart by a distance configured to accommodate a sliding plate member 180 of the sliding carriage subassembly 128. Sliding tongues 184 on the sliding plate member 180 are slidably received in the respective grooves 176.

Figure 7A:
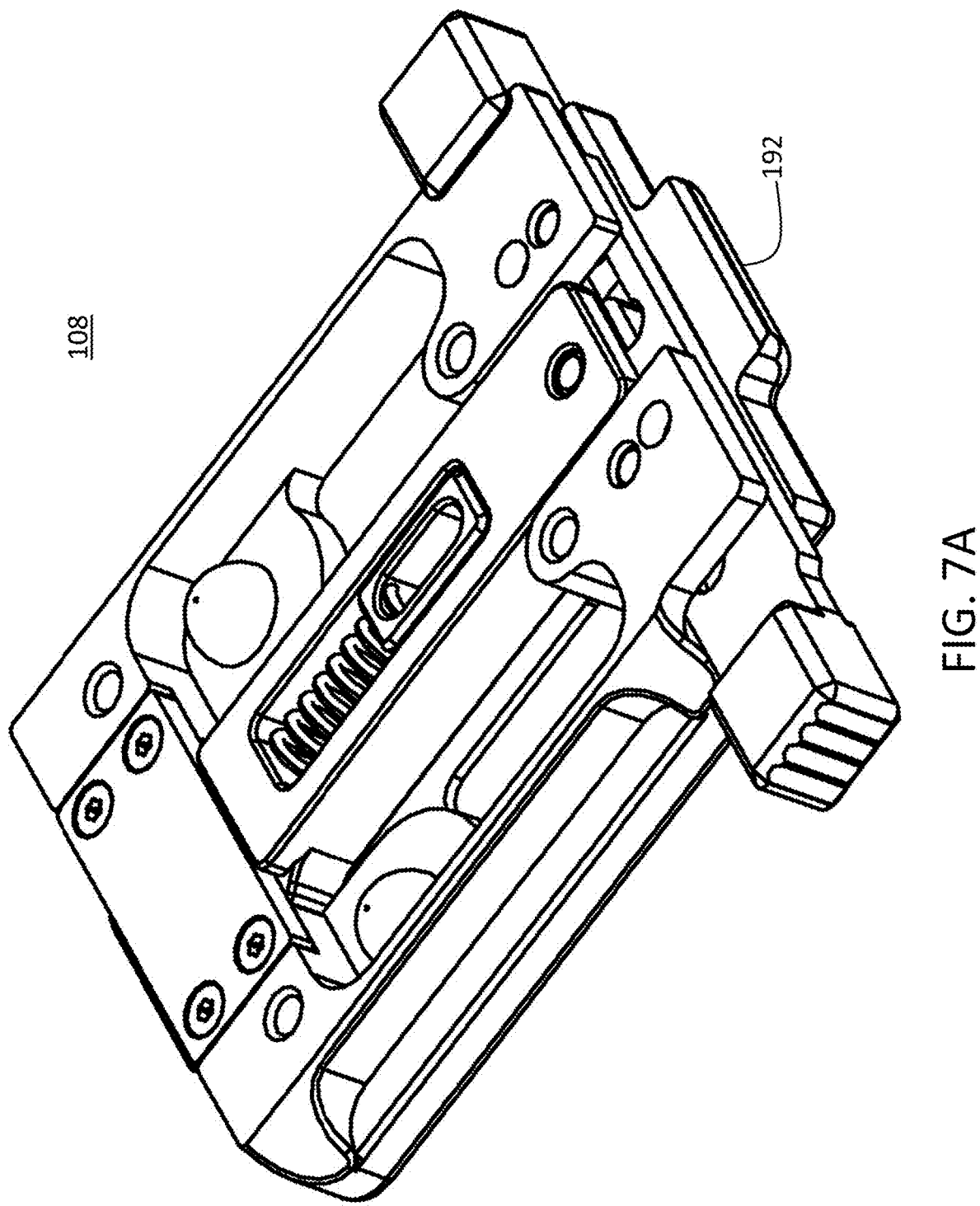
FIG. 7A is an isometric view of an interface assembly for detachably coupling the helmet track assembly to the front shroud of a helmet.
Figure 7B:
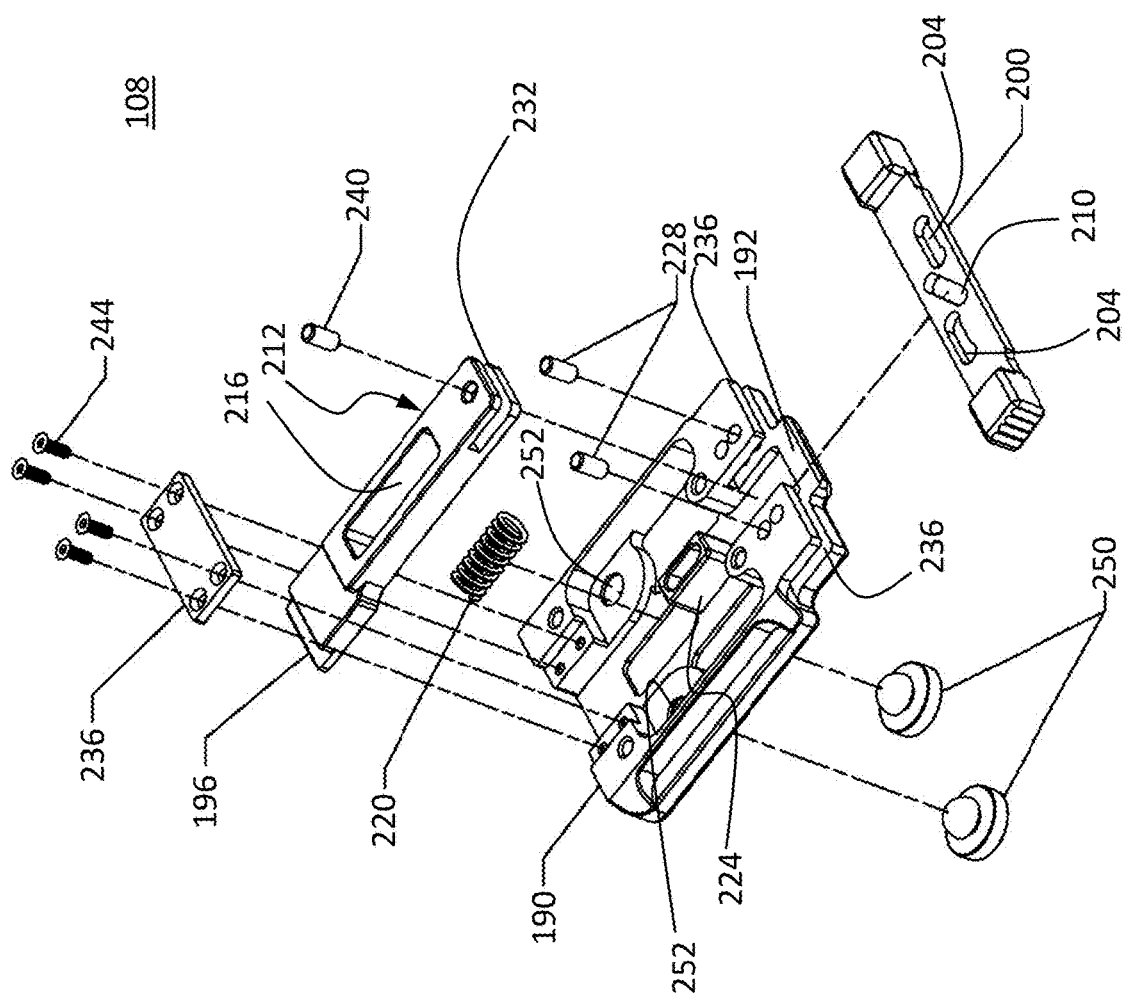
FIG. 7B is an exploded isometric view of the interface assembly appearing in FIG. 7A.

Referring now to FIGS. 7A and 7B, the shroud interface subassembly 108 includes a base plate 190. A fixed locking tongue 192 is disposed on a lower end of the base plate 190 and is configured to be received in a corresponding lower interface groove (not shown) on the shroud 116a, 116b. A movable locking tongue 196 is disposed at a distal end of a carrier 212. The movable locking tongue is positioned at an upper end of the base plate 190 and is configured to be received in a corresponding upper interface groove (not shown) on the shroud 116a, 116b.

The carrier 212 includes an elongate opening receiving a tensioning spring 220. One end of the spring 220 bears against a spring boss 224 on the base plate 190 and urges or biases the carrier 212 and locking tongue 196 upward. The proximal end of the carrier 212 includes a slot 232. The lower end of the base plate 190 includes slots 236 adjacent and aligned with the slot 232.

An actuator bar 200 is transversely slidably received within the slots 232, 236. The extent of sliding movement of the actuator bar 200 with respect to the base plate 190 is constrained by guide pins 228 passing through the channels 236 and riding in elongate slots 204 in the actuator bar 200. Movement of the actuator bar 200 in relation to the carrier 212 is constrained by an actuator pin 240 passing through the channel 232 and an elongate opening 210 in the actuator bar 210. The elongate opening 210 is angled relative to the horizontal or transverse direction such that transverse sliding movement of the actuator bar 200 causes up and down movement of the carrier 212. The spring 220 biases the carrier so that it is retained in the upper position such that the upper tongue 196 is extended. In order to retract the tongue 196, i.e., for the purpose of attaching or removing the interface assembly 108 to the shroud 116a, 116b, the actuator bar 200 is manually moved by the user against the bias of the spring 200. In embodiments, dampening members such as grommets 250 are received in openings 252 in the base plate 190 to decrease noise or vibration between the shroud interface assembly 108 and the shroud 116a, 116b. In embodiments, the shroud interface subassembly 108 operates in a manner similar to the interface assembly as shown and described in commonly owned U.S. Pat. No. 8,739,313, albeit inverted, with respect to the shroud interface subassembly 108. U.S. Pat. No. 8,739,313 is incorporated herein by reference in its entirety.

Figure 8A:
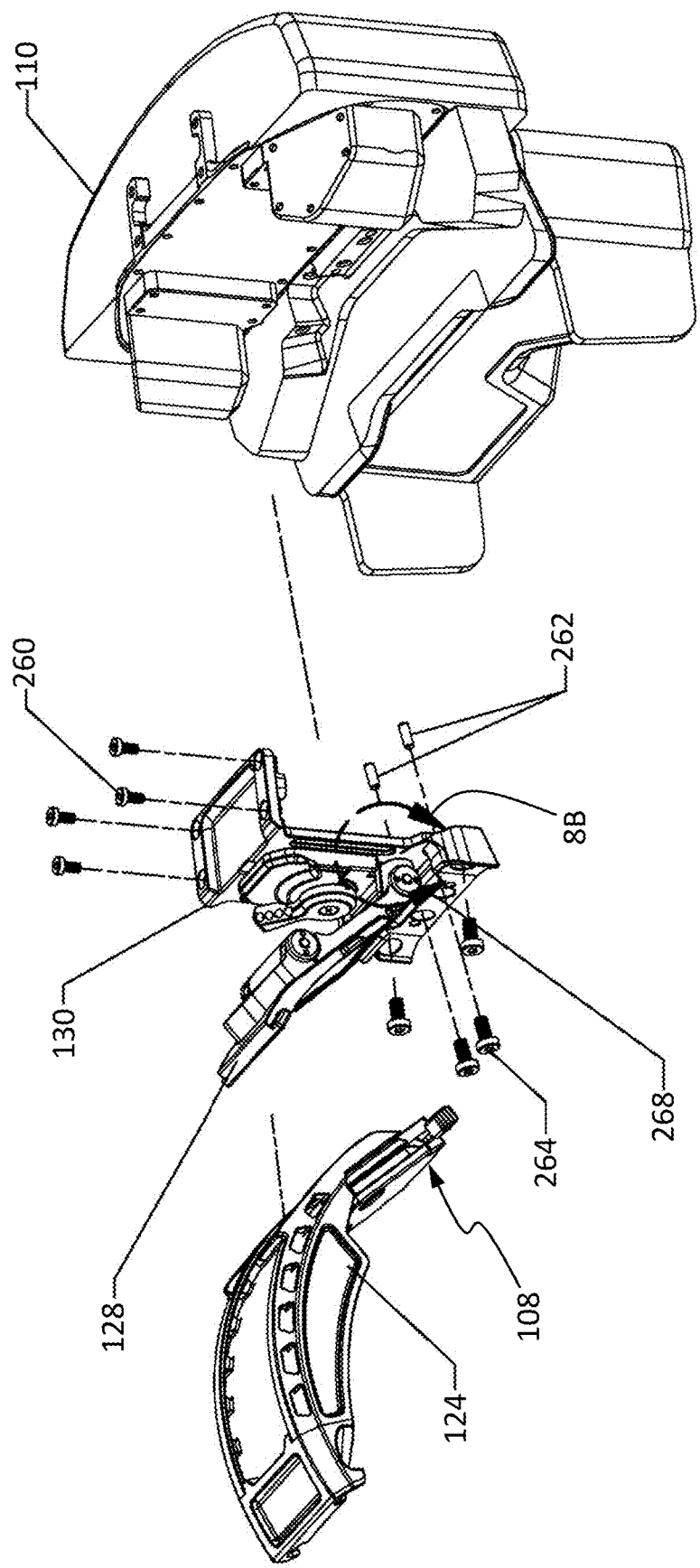
FIG. 8A is an isometric view of the track assembly, viewing device interface assembly and viewing device.
Figure 8B:
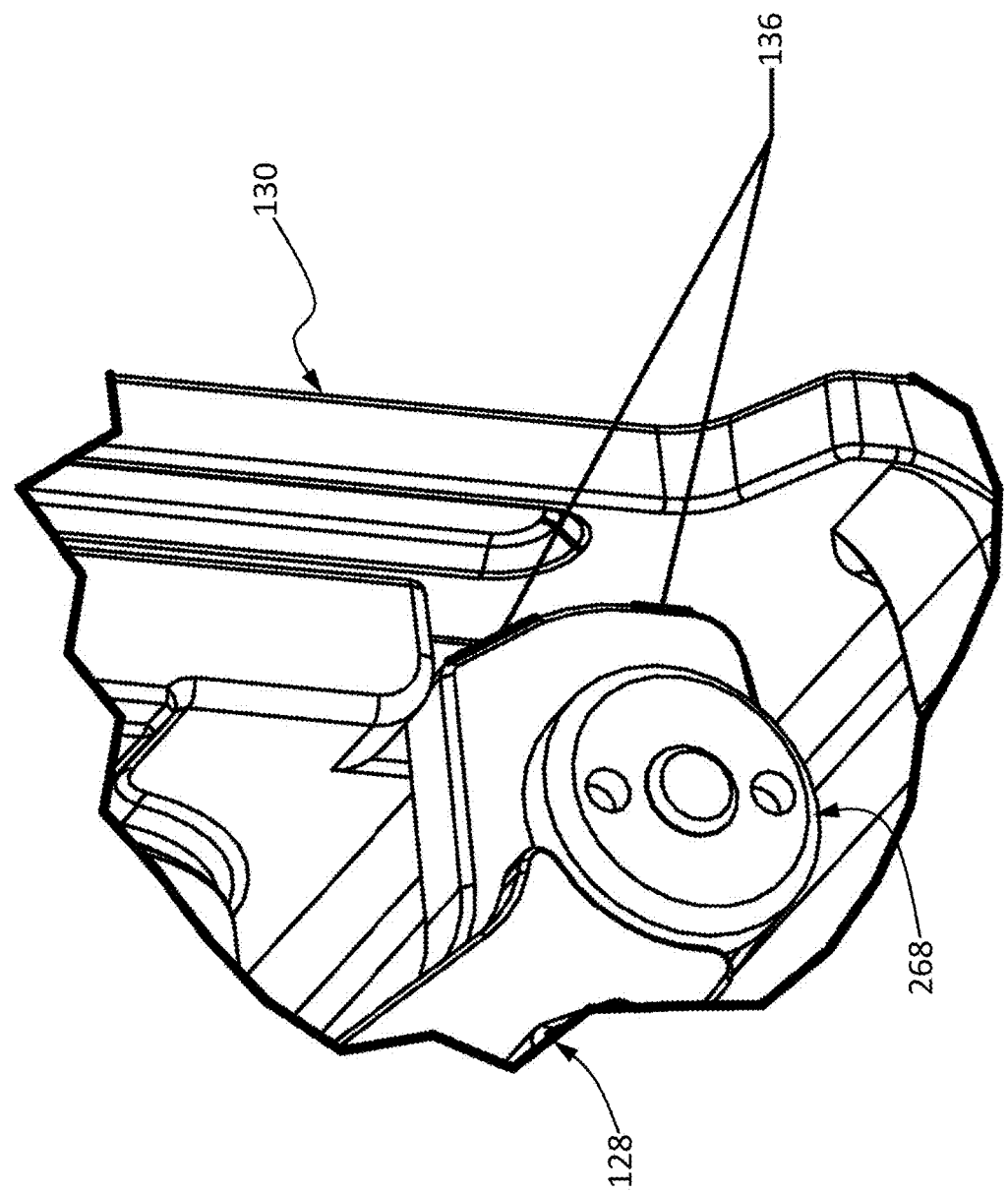
FIG. 8B is an enlarged view of the region 8B appearing in FIG. 8A.

Referring now to FIGS. 8A and 8B, the viewing device 110 is secured to the vertical adjustment subassembly 130 via a first set of threaded fasteners 260 engaging an upper housing portion of the viewing device 110 and a second set of threaded fasteners 264 engaging a rear housing portion of the viewing device 110. Alignment pins 262 extend from the vertical adjustment subassembly and are configured to engage complementary receptacles on the viewing device 110 for ensuring proper alignment of the vertical adjustment subassembly 130 with the viewing device 110. In embodiments, the forward facing side of the vertical adjustment subassembly 130 defines a mounting bracket for attaching the viewing device 110.

Figure 9:
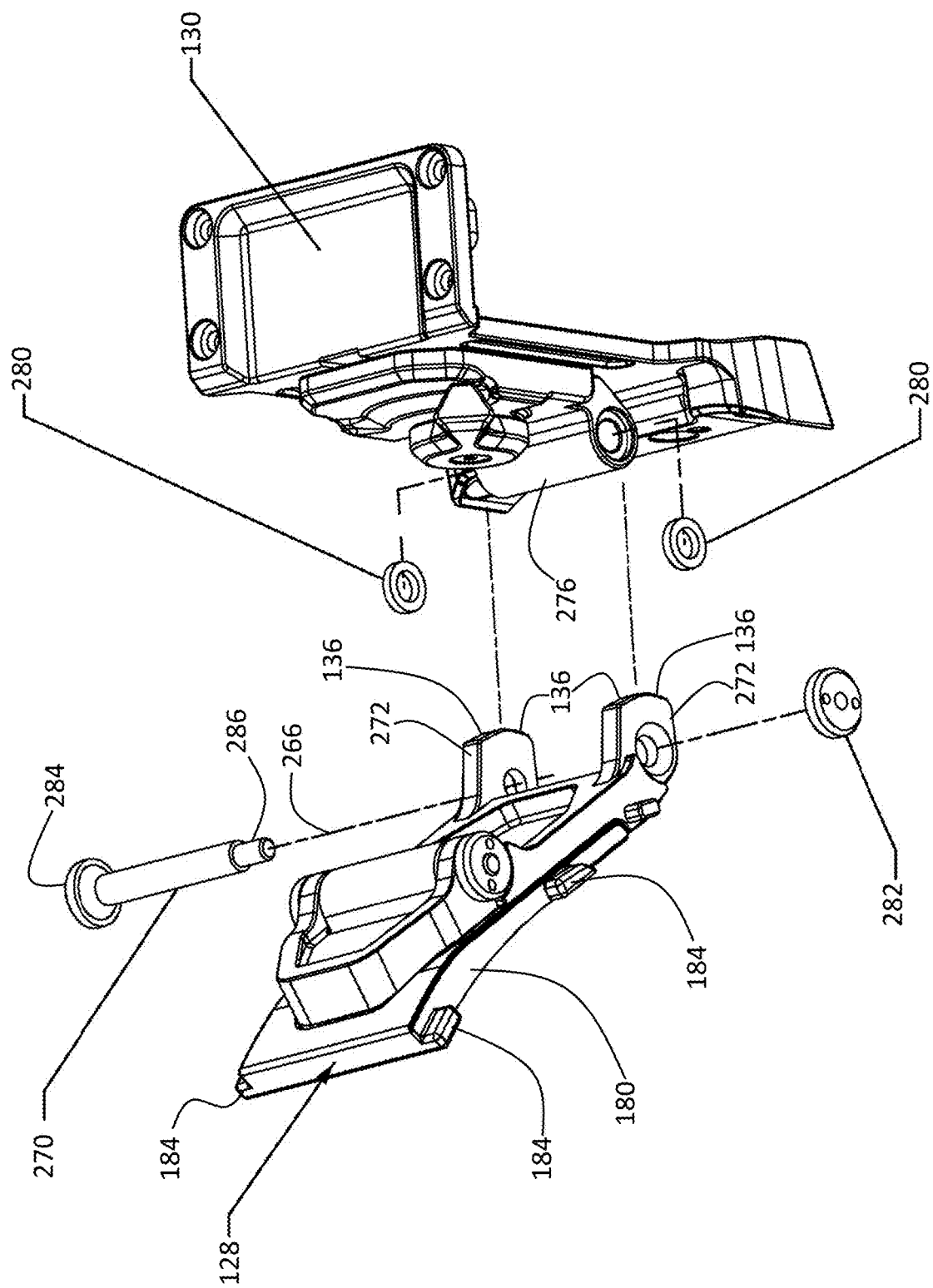
FIG. 9 is a partially exploded isometric view of the sliding carriage and vertical adjustment subassemblies.

Referring now to FIGS. 8A, 8B, and 9, the vertical adjustment subassembly 130 is pivotally attached to the sliding carriage subassembly 128 via a first pivot assembly 268 defining a pivot axis 266. The pivot assembly 268 includes a first pivot rod 270 passing through outer hinge knuckles 272 on the sliding carriage subassembly 128 and an inner hinge knuckle 276 on the vertical adjustment subassembly 130. A first tensioning washer 280 is disposed between one of the outer knuckles 272 and a head 284 of the rod 270. A second tensioning washer 280 is disposed between the other one of the outer knuckles 272 and a threaded cap 282 engaging a threaded end 286 of the rod 270. The cap 282 is tightened to provide a constantly tensioned pivot assembly that allows about, e.g., 30 degrees or more of rotational tilt, with the extent of pivoting rotation being limited by the tilt limiting stop flats 136.

Figure 10A:
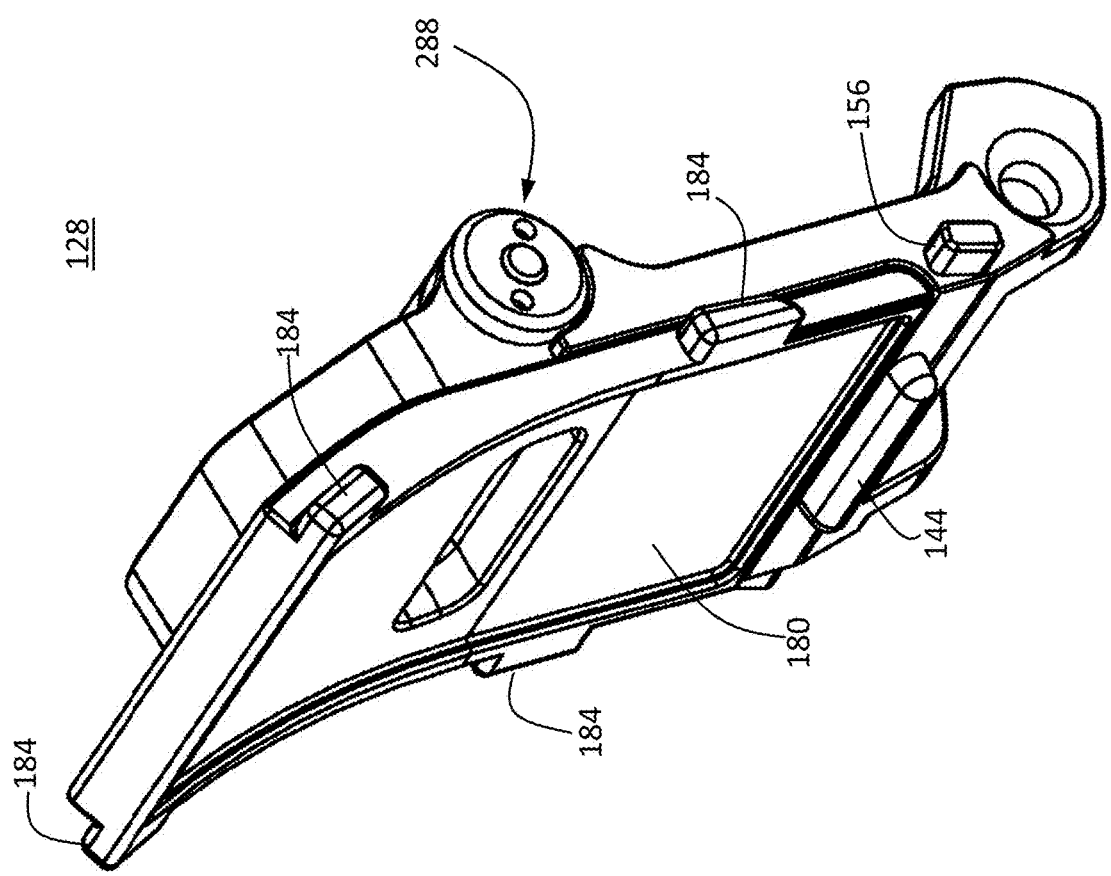
FIG. 10A is a generally rear isometric view of the sliding carriage subassembly.

Referring now to FIGS. 10A and 10B, a second pivot hinge assembly 288 defines a pivot axis 300 and includes a second pivot rod 290 passing through second outer hinge knuckles 292 on a carriage pivot lock plate 294 and a second inner hinge knuckle 296 on a slide carriage plate 298. The inner hinge knuckle 296 passes through an opening 308 in the carriage pivot lock plate 294. A threaded cap 302 engages a threaded end 306 of the rod 290. Compression springs 310 are disposed between the upper end of the carriage pivot lock plate 294 and the upper end of the slide carriage plate 298. The springs 310 bear against the upper end of the carriage pivot lock plate 294, thereby biasing the carriage locking tongue 144 toward the track assembly 124 to secure the tongue 144 into engagement with the groove 148 when the main sliding carriage assembly 128 is in the deployed position and to secure the locking tabs 156 into engagement with the locking shoulders 158 when the main sliding carriage assembly 128 is in the stowed position.

Figure 11A:
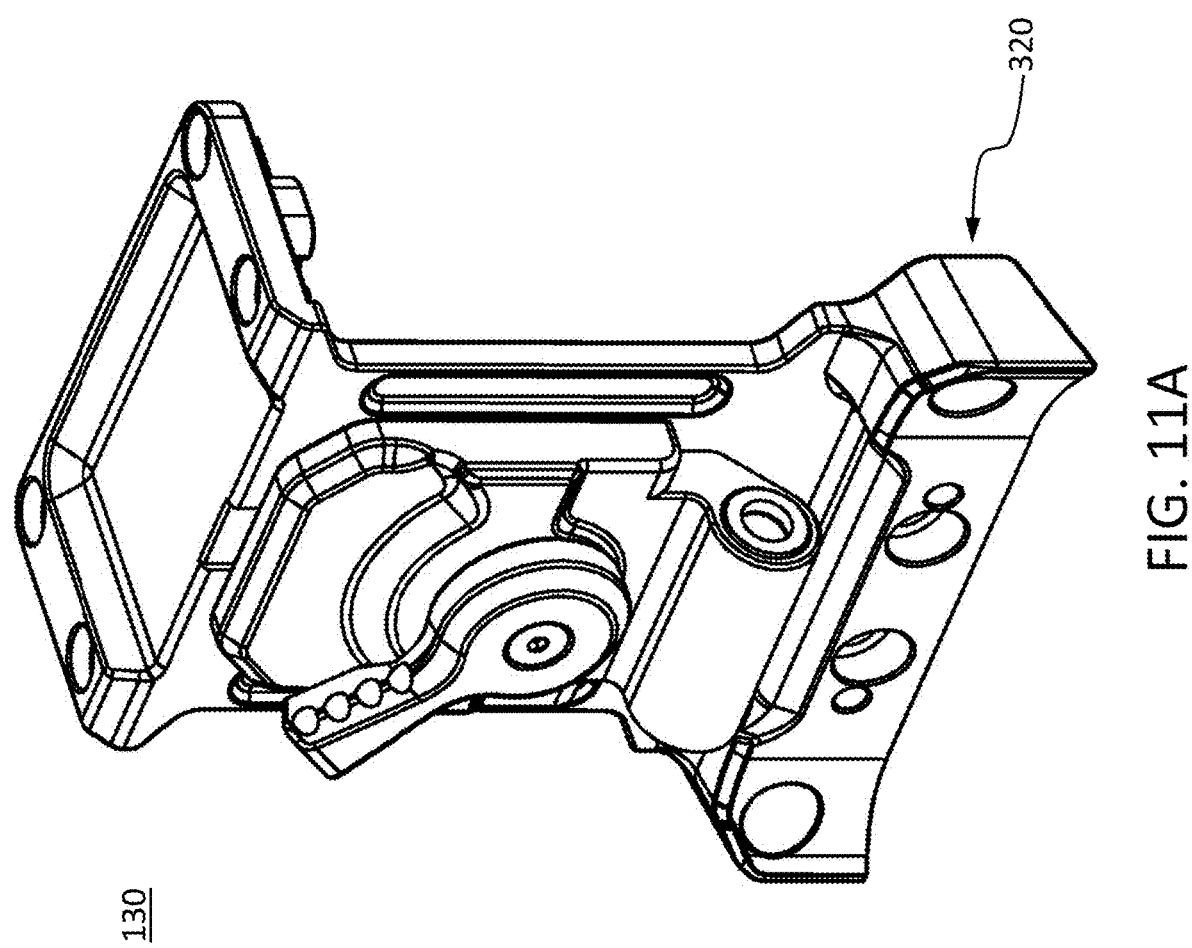
FIG. 11A is an isometric view of the vertical adjustment subassembly.
Figure 11B:
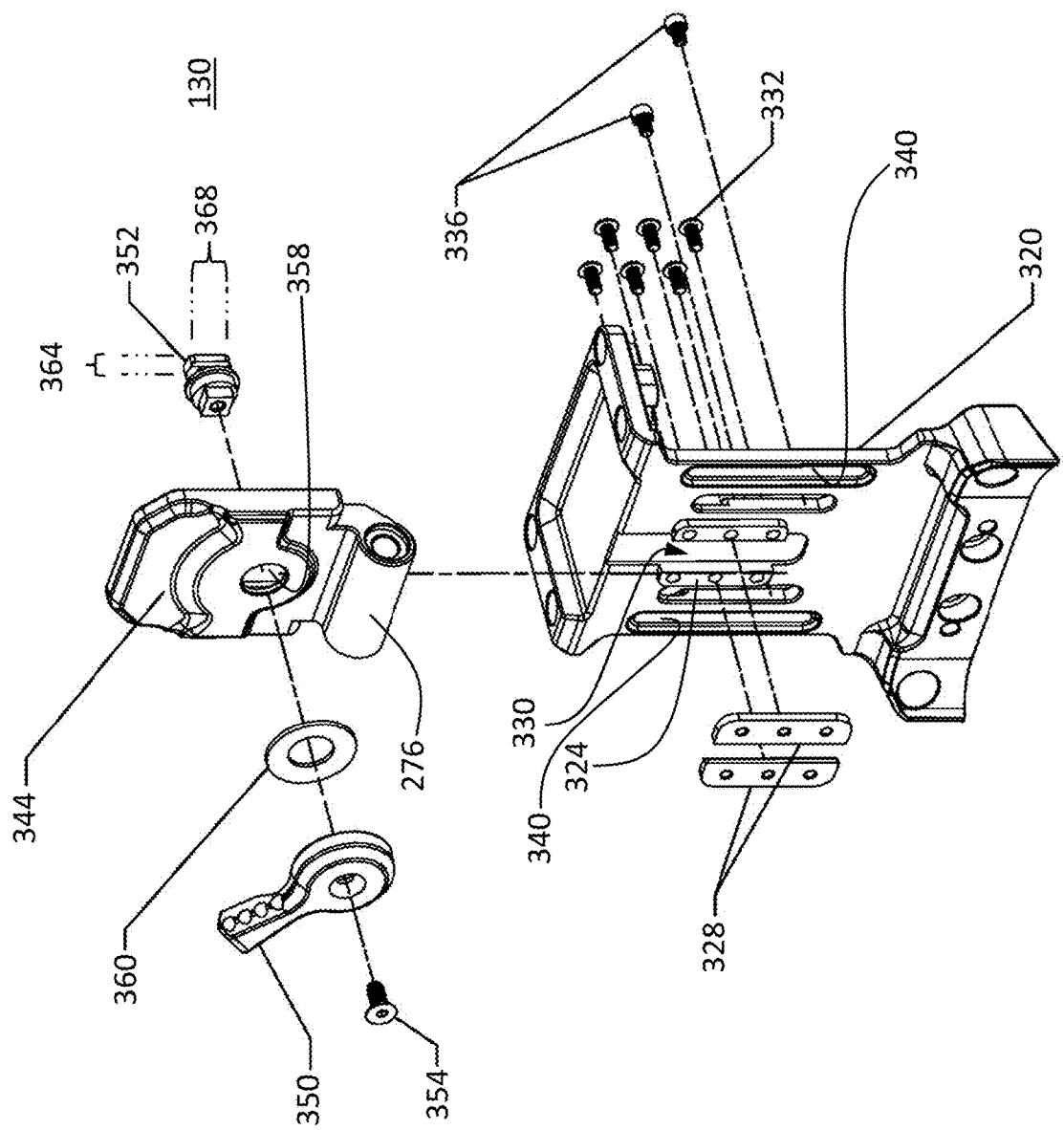
FIG. 11B is an exploded isometric view of the vertical adjustment subassembly.

Referring now to FIGS. 11A and 11B, the vertical adjustment subassembly 130, includes a base member 320 which is secured to the housing of the viewing device 110 as described above. A lock rail assembly comprises elongate vertical bosses 324 having elongate lock rails 328 attached thereto with threaded fasteners 332 and defining a channel 330 therebetween.

Travel limiters 336 pass through and ride in elongate vertical slots 340 and threadably engage a vertical adjust pivot plate 344. The slots 340 limit the extent of vertical travel of the vertical adjust pivot plate 344 locking tabs relative to the base member 320. A lock lever 350 is secured to a rear facing side of the vertical adjust pivot plate 344 and a cam lock member 352 is secured to a front facing surface of the vertical adjust pivot plate 344 via a threaded fastener 354 passing through a clearance opening 358 in the vertical adjust pivot plate 344. A conical washer or disc spring 360 is disposed between the lever 350 and the vertical adjust pivot plate 344 to develop a tension therebetween.

The cam lock member has a narrow dimension 364 and a wide dimension 368. When the cam lock member 352 is rotated using the lever 350 so that the narrow dimension 364 is aligned with the channel 340, the vertical adjust pivot plate 344 can slide freely along the lock rails 328, allowing the vertical adjust pivot plate 344 be positioned at a desired height to vertically align the viewing device 110 with the to the user's eyes. When the lever 350 is rotated to rotate the wide dimension 368 toward a transverse orientation, the cam lock member 352 wedges tightly within the channel 340 to create a secure locked position.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A helmet mount apparatus for adjusting a position of a viewing device on a helmet, said helmet mount apparatus comprising:
    a track subassembly removably attachable to the helmet;
    a carriage subassembly slidably attached to and movable along said track subassembly between a deployed position, wherein the viewing device is generally aligned with a user's line of sight when worn by the user, and a stowed position, wherein the viewing device is positioned above the user's line of sight when worn by the user;
    a vertical adjustment subassembly configured for detachably coupling the viewing device; and
    a first pivot assembly disposed between said carriage subassembly and said vertical adjustment subassembly such that said vertical adjustment subassembly and the viewing device removably attached thereto are pivotable with respect to said carriage subassembly and the helmet.

2. The helmet mount apparatus of claim 1, further comprising:
    said carriage subassembly comprising a locking tongue extending inward toward the helmet and first and second locking tabs extending laterally from opposing sides of said carriage subassembly; and
    said track subassembly comprising:
        a groove that engages with said locking tongue to place said carriage subassembly in the deployed position wherein the viewing device is generally parallel to the user's line of sight; and
        first and second locking shoulders that engage with said first and second locking tabs, respectively, to place said carriage subassembly in the stowed position wherein the viewing device is above the user's line of sight.

3. The helmet mount apparatus of claim 2, further comprising:
    said carriage subassembly further comprising a sliding plate member having an outward-extending second inner hinge knuckle and a carriage pivot lock plate, wherein said sliding plate member is disposed between said track subassembly and said carriage pivot lock plate;
    said locking tongue being disposed on a lower end of said carriage pivot lock plate;
    said carriage pivot lock plate comprising an opening and second outer hinge knuckles, wherein said second inner hinge knuckle of said sliding plate member passes through said opening and is complementary with said second outer hinge knuckles;
    said helmet mount apparatus further comprising a second pivot hinge assembly having a second pivot rod passing through said second outer and inner knuckles; and
    one or more springs disposed intermediate the carriage pivot lock plate and the sliding plate member, the one or more spring configured to bias the locking tongue toward said track subassembly for secure engagement of said locking tongue and said groove.

4. The helmet mount apparatus of claim 1, wherein:
    said carriage subassembly further comprises a sliding plate member having one or more sliding tongues extending transversely from opposing sides thereof; and
    said track subassembly comprises a track with channels transversely spaced apart on opposing sides of said track, said channels spaced to accommodate said sliding plate member and configured to slidably receive said one or more sliding tongues.

5. The helmet mount apparatus of claim 1, wherein said track subassembly further comprises a track stop configured to limit a range of sliding movement of the carriage along the track subassembly.

6. The helmet mount apparatus of claim 1, further comprising:
    said carriage subassembly comprising opposing first and second outer hinge knuckles;
    said vertical adjustment subassembly comprises one or more inner hinge knuckles intermediate the first and second outer hinge knuckles; and
    said first pivot assembly comprises a first pivot rod passing through said first and second outer hinge knuckles and said one or more inner hinge knuckles along a first pivot axis.

7. The helmet mount apparatus of claim 6, wherein the first and second outer hinge knuckles engage the vertical adjustment subassembly, the first and second outer hinge knuckles having tilt-limiting stop flats formed thereon for limiting a range of rotation of said vertical adjustment subassembly with respect to said carriage subassembly.

8. The helmet mount apparatus of claim 7, wherein said first pivot assembly has an angle of rotation of about 15 degrees.

9. The helmet mount apparatus of claim 1, wherein said vertical adjustment subassembly comprises a mounting bracket for attaching the viewing device.

10. The helmet mount apparatus of claim 1, wherein said vertical adjustment subassembly comprises one or more alignment pins configured to engage one or more complementary receptacles in the viewing device for aligning said vertical adjustment subassembly with the viewing device.

11. The helmet mount apparatus of claim 1, wherein said track subassembly comprises at least one cable management trough.

12. The helmet mount apparatus of claim 1, wherein said vertical adjustment subassembly is configured to allow vertical adjustment of the viewing device with respect to a user's line of sight.

13. A method for operating a helmet mount apparatus comprising a track subassembly removably attachable to the helmet; a carriage subassembly slidably attached to and movable along said track subassembly between a deployed position, wherein the viewing device is generally aligned with a user's line of sight when worn by the user, and a stowed position, wherein the viewing device is positioned above the user's line of sight when worn by the user; a vertical adjustment subassembly configured for detachably coupling the viewing device; and a first pivot assembly disposed between said carriage subassembly and said vertical adjustment subassembly such that said vertical adjustment subassembly and the viewing device removably attached thereto are pivotable with respect to said carriage subassembly and the helmet, the method comprising the steps of:
  if the helmet mount apparatus is in the deployed position:
    rotating the viewing device upward by rotating along the first pivot assembly;
    pushing the viewing device outward, away from the track subassembly such that the locking tongue of the carriage subassembly disengages from the groove of the track subassembly; and
    sliding the viewing device upward with respect to the track subassembly until the locking tabs of the carriage subassembly move past the shoulder of the track subassembly; and
  if the helmet mount apparatus is in the deployed position:
    pushing the viewing device outward, away from the track subassembly such that the locking tabs of the carriage subassembly disengage from the shoulders of the track subassembly;
    sliding the viewing device downward with respect to the track subassembly until the locking tongue of the carriage assembly engages with the groove of the track subassembly; and
    rotating the viewing device downward by rotating along the first pivot assembly.

* * * * *